United States Patent [19]

Morgan et al.

[11] 4,249,043
[45] Feb. 3, 1981

[54] ELECTRET TRANSDUCER BACKPLATE, ELECTRET TRANSDUCER AND METHOD OF MAKING AN ELECTRET TRANSDUCER

[75] Inventors: Adrian J. Morgan, Woodbridge; John K. Williams, Ipswich; Ronald Else, Woodbridge, all of England

[73] Assignee: Post Office, London, England

[21] Appl. No.: 965,316

[22] Filed: Nov. 28, 1978

[30] Foreign Application Priority Data

Dec. 2, 1977 [GB] United Kingdom ............... 50336/77

[51] Int. Cl.³ ...................... H04R 19/00; H04R 31/00
[52] U.S. Cl. .................................... 179/111 E; 29/594
[58] Field of Search ........................ 179/111 R, 111 E; 29/594

[56] References Cited

U.S. PATENT DOCUMENTS

| 2,159,628 | 5/1939 | Danielson ........................ 179/111 R |
| 3,787,642 | 1/1974 | Young, Jr. ........................ 179/111 E |
| 3,991,285 | 11/1976 | Van Den Worm et al. .... 179/111 E |
| 4,014,091 | 3/1977 | Kodera et al. .................... 179/111 E |
| 4,042,438 | 8/1977 | Kawakami et al. .............. 179/111 E |

FOREIGN PATENT DOCUMENTS 2318067 10/1974 Fed. Rep. of Germany ....... 179/111 E
832276 4/1960 United Kingdom ................ 179/111 E

OTHER PUBLICATIONS

IEEE Trans. Audio & Electroacoustics, vol. AU-19, No. 1, Mar. 1971, "Electret Transducers Applied to the Telephone", C. W. Reedyk, pp. 1-5.

Primary Examiner—Vincent P. Canney
Attorney, Agent, or Firm—Mason, Fenwick & Lawrence

[57] ABSTRACT

An electret transducer backplate is made of a thermo-softening plastics material rendered electrically conducting by electrically conducting particles distributed therethrough. An electret foil diaphragm is mounted on the backplate and the relative flexural rigidities of the diaphragm and the backplate are such that, in use, the deflection of the diaphragm is at least twenty times as great as the deflection of the backplate. A method of making the transducer involves heating an electret foil, bonding the electret foil to a retaining ring while the foil is hot and securing together the retaining ring and the backplate.

14 Claims, 8 Drawing Figures

ELECTRET TRANSDUCER BACKPLATE, ELECTRET TRANSDUCER AND METHOD OF MAKING AN ELECTRET TRANSDUCER

This invention relates to electret transducer backplates and methods of making electret transducers.

Microphones incorporating electret transducers can compete in terms of electrical and acoustic performance with good quality microphones of the moving coil or ribbon type and yet are more robust and cheap to manufacture.

In the past electret transducers have been provided with a backplate made either of metal or of a plastics material on which a conductive layer of metal has been deposited, for example in one form of backplate aluminium is vacuum deposited onto polystyrene. The use of a metal backplate necessitates a more difficult manufacturing process than a plastics backplate, particularly since the backplate must be shaped fairly accurately. The manufacture of a plastics backplate is in itself quite simple but the subsequent deposition of a conductive layer of metal introduces an additional step in the manufacturing process and thus increases the cost of production. Also, the metal coating is liable to corrode and it is relatively difficult to make a reliable electrical connection to the metal coating on the backplate. Thus in the case of either a metal backplate or a plastics backplate having a conductive metal coating there are difficulties in the production of the backplate.

It is an object of the invention to provide an electret transducer backplate constructed such as to obviate at least in part the difficulties described above.

According to the invention an electret transducer backplate is made of a thermo-softening plastics material rendered electrically conducting by electrically conducting particles distributed therethrough.

The use of such a conductive plastics material for an electret transducer backplate might at first sight seem strange to one skilled in the art since such materials might be thought to be unsuitable in two respects: first they are thought of as relatively soft materials and therefore liable to be damaged or deform excessively when mounted in a transducer; secondly they are thought of as materials which are liable to warp during extraction from the mould thereby preventing proper mounting of a diaphragm on the backplate.

It has, however, been found that conductive plastics materials can be used successfully for an electret transducer backplate and that such a backplate has the advantages of a backplate comprising an insulating plastics material onto which a conductive layer of metal has been deposited, but is simpler to produce since no coating of the plastics backplate is required and the number of operations required in manufacture is therefore fewer. Also the provision of a conductive plastics backplate obviates the problems inherent in coated plastics backplates of making electrical connection to the backplate and of corrosion of the conductive coating on the backplate. Furthermore the disadvantages of conductive plastics materials mentioned above, namely softness and difficulty of moulding can be reduced considerably by suitable selection of the conductive plastics material.

In one embodiment of the invention the electrically conducting particles are carbon particles and the plastics material is polypropylene.

A metal termination may be moulded into the backplate to facilitate electrical connection to the backplate.

Alternatively the backplate may be formed with an integral stem extending from the rear face of the backplate to provide an electrical connection facility.

The backplate may be substantially cup-shaped.

Preferably, the hardness of the material of the backplate is greater than 40 units as measured in the "Shore D" hardness test.

According to another aspect of the invention there is provided an electret transducer including a backplate as defined above and a diaphragm mounted on the backplate wherein the flexural rigidities of the backplate and of the diaphragm are such that, in use, the deflection of the diaphragm is at least twenty times as great as the deflection of the backplate. This ensures that the sensitivity of the transducer is not excessively impaired.

The diaphragm may be mounted on the inner side of the backplate, the backplate being foraminous. This protects the diaphragm from accidental damage.

The casing of the transducer may be formed by the backplate. This simplifies the manufacture of the transducer.

According to another aspect of the invention a method of making an electret transducer includes the steps of:

forming a backplate of a thermo-softening plastics material rendered electrically conducting by electrically conducting particles distributed therethrough; and mounting an electret foil diaphragm on the backplate.

The step of mounting the electret foil diaphragm on the backplate may comprise the steps of heating an electret foil, bonding the electret foil to a retaining ring and securing together the retaining ring and the backplate.

The steps of heating the electret foil and bonding the foil to the retaining ring may comprise the steps of heating a plate, placing the electret foil on the plate and bonding the retaining ring to the foil with an adhesive while the foil is on the plate.

The temperature to which the electret foil is heated may be of the order of 45° C.

According to a further aspect of the invention there is provided an electret transducer made by a method as defined above.

By way of example certain illustrative embodiments of the invention will now be described with reference to the accompanying drawings, of which:

Figure 1:
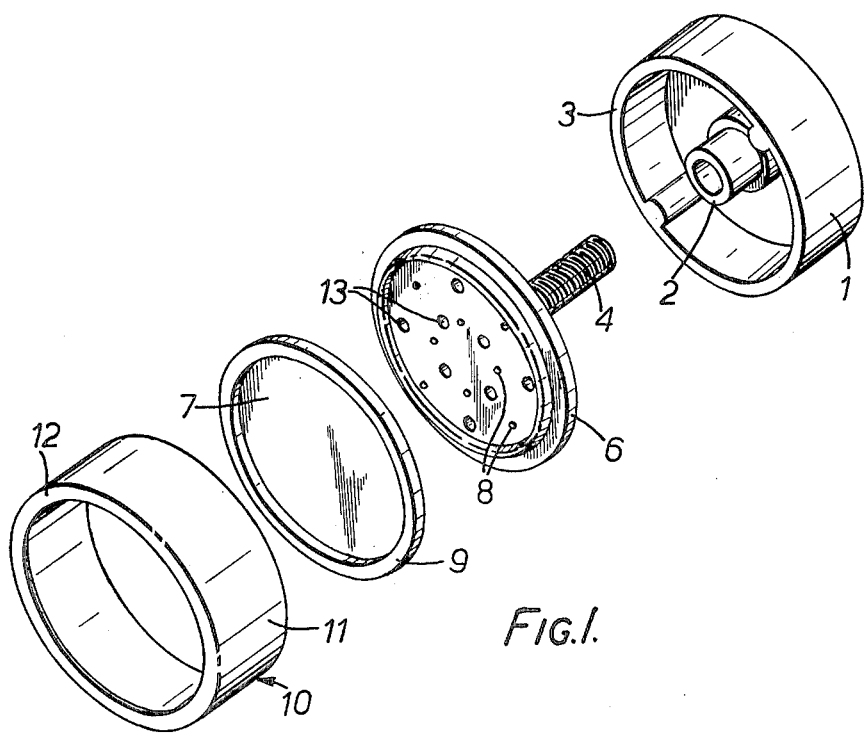
FIG. 1 is an exploded perspective view of an electret tranducer.
Figure 2:
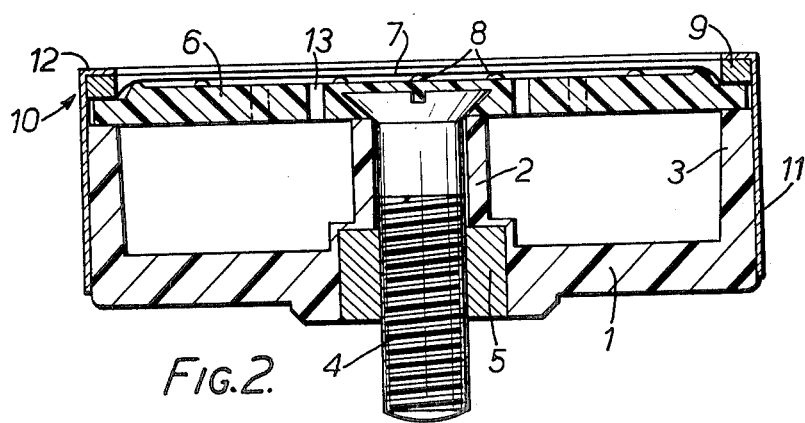
FIG. 2 is a sectional elevation of the transducer.

The transducer shown in FIGS. 1 and 2 includes a body member 1 of plastics material having inner and outer concentric walls 2 and 3 and a central recess in which a brass nut 5 is housed; a backplate 6 is mounted over the ends of the walls 2 and 3 and is secured to the body member by a brass screw 4 whose head is moulded centrally into the backplate and which extends inside the wall 2 and is screwed onto the brass nut 5; an electret foil diaphragm 7 having an aluminised face extends across the exposed face of the backplate 6 with its aluminised face uppermost and is spaced from the backplate by pimples 8 which are formed on and distributed over the face of the backplate. The diaphragm 7 is retained in position over the backplate by a brass ring 9 to which it is secured and which is positioned around the edge of the backplate. A copper case 10 having a cylindrical portion 11 and an inwardly directed flange 12 is located over the ring 9 and around the backplate 6 and body member 1.

When the transducer is in use, an electrical connection is made to the copper case 10 and another electrical connection made to the brass screw 4. Conveniently the connection to the copper case 10 is an earth connection and also serves to mount the transducer in the required position.

The backplate 6 is made from a thermo-softening plastics material rendered electrically conducting by electrically conducting particles distributed therethrough.

The pimples 8 are typically of the order of one to three thousandths of an inch in height since this is the required spacing of the diaphragm 7 and backplate 6. Since this spacing is so small the backplate 6 must be accurately moulded.

The flexural rigidity of the backplate 6 must be high compared to the flexural rigidity of the diaphragm 7 in order that the sensitivity of the transducer is not excessively impaired. The relative values of flexural rigidity that are desirable will depend upon the construction of the diaphragm 7 and the backplate 6; for example the relative values will depend upon the size of the diaphragm and the number of locations at which it is supported. The flexural rigidities of the backplate 6 and the diaphragm 7 should be chosen such that in the assembled transducer the deflection of the diaphragm, in operation of the transducer, is at least twenty times the deflection of the backplate.

It is also advantageous for the material of which the backplate 6 is made to be hard and fairly creep resistant. This ensures that a reliable and long lasting clamping of the diaphragm 7 onto the backplate 6 can be achieved. In a particular example the hardness of the material of the backplate is 70 units as measured in the "Shore D" hardness test.

The use of a thermo-softening plastics material facilitates production of the backplate since a conventional injection moulding process may be used. One example of a suitable material which may be used is carbon loaded polypropylene. This material can be moulded very accurately and is easily ejectable from the mould. Easy ejection is important since this reduces the likelihood of damage to the backplate during ejection.

Figure 3:
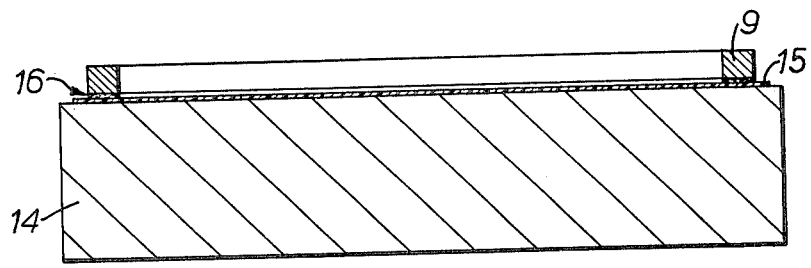
FIG. 3 illustrates a method of making a part of the transducer.

The diaphragm 7 is attached to the brass ring 9 by the following method which will be described with reference to FIG. 3. An electret foil 15 (the thickness of which is exaggerated in FIG. 3) from which the diaphragm 7 is made is first placed on a heated copper platen 14 heated to a temperature of 45° C. and is then attached to the brass ring 9 using a cyanoacrylate adhesive 16 (the thickness of which is exaggerated in FIG. 3); as the electret foil cools it is evenly stretched across the ring giving highly controlled, even and reproducible tensions in the foil; the temperature to which the foil is heated should be of the same order as or higher than the highest intended operating temperature of the transducer. Excess electret material around the brass ring 9 is then trimmed off.

Figure 4:
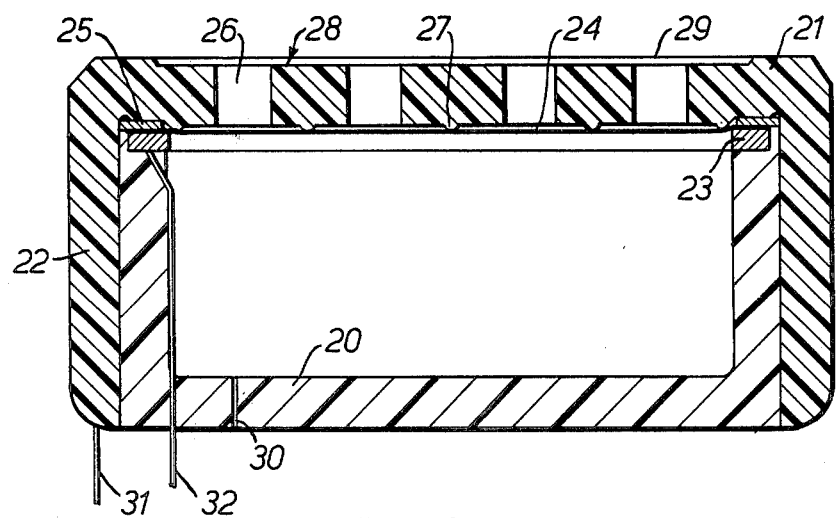
FIG. 4 is a sectional elevation of a modified form of the transducer shown in FIGS. 1 and 2.

An alternative construction of transducer is shown in FIG. 4. Referring to FIG. 4, the transducer has a cup shaped body member 20 over which a conductive plastics backplate 21 which is also cup-shaped is received. The backplate 21 is formed with a peripheral wall 22 which overlies the body member 20 and is secured thereto by an adhesive. A brass ring 23 is received on the top of the body member 20 and a diaphragm 24 is attached to the brass ring 23 in the same way as the diaphragm 7 is attached to the brass ring 9 in the transducer shown in FIGS. 1 and 2. A ring shaped insulating washer 25 is interposed between the diaphragm 24 and the backplate 21 and prevents electrical contact being made accidentally between the opposing faces of the brass ring 9 and the backplate (a similar washer may be interposed between the diaphragm 7 and the backplate 6 in the transducer shown in FIGS. 1 and 2). The lower face of the diaphragm 24 is aluminised.

The top of the backplate 21 is substantially the same as the backplate 6 but is oriented the other way up. The backplate 21 has holes 26 corresponding to the holes 13 in the backplate 6 and has pimples 27 corresponding to the pimples 8 on the backplate 6. The backplate 21 is made of the same material as the backplate 6 and the flexural rigidities of the backplate 21 and the diaphragm 24 are chosen in the same way as for the backplate 6 and the diaphragm 7.

The backplate 21 has a recessed upper face 28 over which a membrane 29 is fitted. The membrane 29 does not provide any substantial barrier to sound waves but prevents dust and condensation collecting on the diaphragm 24.

A small presure equalisation hole 30 is provided in the body member 20 to provide long-term pressure equalisation of the pressure in the transducer and ambient pressure. A similar hole (not shown) is provided in the body member 1 of the transducer shown in FIGS. 1 and 2.

Electrical connection to the backplate 21 is made by moulding a lead 31 into the backplate. Another lead 32 is connected to the brass ring 23.

The transducer shown in FIG. 4 is particularly simple to manufacture since the backplate 21 also acts as the casing of the transducer. The number of components from which the transducer is made is reduced and the assembly of the transducer is simplified.

Although two particular constructions of an electret transducer have been described it should be understood that a backplate embodying the invention may be used in transducers of other constructions and in these other constructions the construction of the backplate may be quite different. For example patterns may be moulded into the backplate as required, as may projections or recesses to facilitate mounting of the backplate.

In the embodiment of FIGS. 1 and 2 the holes 13 may be rearranged or omitted according to the required electroacoustic characteristics of the transducer. Also the screw 4 may be replaced by an integral stem extending from the rear of the backplate; alternatively the screw 4 may be omitted and a wire moulded into the backplate to make the electrical connection to the backplate.

The conductive plastics material from which the backplate is made does not have to be carbon loaded polypropylene. For example, the plastics material may be loaded with metallic particles; also the plastics material may be some other material, for example high density polyethylene.

Other parts of the transducer may also be made of conductive plastics material or of other materials: for example, the rings 9 and 23 may be made of aluminium rather than brass, and the case 10 may be made of conductive plastics material or aluminium instead of copper.

An electret transducer embodying the invention may for example be incorporated in a telephone.

What is claimed is:

1. An electret transducer including a backplate and an electret foil diaphragm mounted over a face of the backplate, wherein the backplate is moulded from a thermo-softening plastics material rendered electrically conducting by electrically conducting particles distributed therethrough, the backplate is provided with protruding portions accurately moulded on said face of the backplate and protruding a predetermined distance from said face and the diaphragm is in contact with the protruding portions and out of contact with the rest of the face of the backplate, the hardness of the material of the backplate is greater than 40 units as measured in the "Shore D" hardness test, and the flexural rigidities of the backplate and of the diaphragm are such that, in use, the deflection of the diaphragm is at least twenty times as great as the deflection of the backplate.

2. A backplate as claimed in claim 1 in which the electrically conducting particles are carbon particles.

3. A backplate as claimed in claim 2 in which the plastics material is polypropylene.

4. A backplate as claimed in claim 1 in which a metal termination is moulded into the backplate.

5. A backplate as claimed in claim 1 in which the backplate is formed with an integral stem extending from the rear face of the backplate.

6. A backplate as claimed in claim 1 in which the backplate is cup-shaped.

7. An electret transducer as claimed in claim 1 wherein the protruding portions comprise a plurality of pimples distributed over said face of the backplate.

8. A transducer as claimed in claim 1 in which the diaphragm is mounted on the inner side of the backplate and the backplate is foraminous.

9. A transducer as claimed in claim 8 in which the casing of the transducer is formed by the backplate.

10. An electret transducer including a backplate and a diaphragm mounted over a face of the backplate, wherein the backplate is moulded from polypropylene rendered electrically conducting by carbon particles distributed therethrough, the backplate is provided with protruding portions accurately moulded on said face of the backplate and protruding a predetermined distance from said face and the diaphragm is in contact with the protruding portions and out of contact with the rest of the face of the backplate, a plurality of holes are provided in the backplate extending from said face through the backplate, the flexural rigidity of the backplate and of the diaphragm are such that, in use, the deflection of the diaphragm is at least twenty times as great as the deflection of the backplate.

11. A method of making an electret transducer including the steps of:

moulding a backplate from a thermo-softening plastics material rendered electrically conducting by electrically conducting particles distributed therethrough, the backplate having protruding portions accurately moulded on a face of the backplate and protruding a predetermined distance from said face and having a hardness greater than 40 units as measured in the "Shore D" hardness test, and mounting an electret foil diaphragm over said face of the backplate with the diaphragm in contact with the protruding portions and out of contact with the rest of the face of the backplate, the flexural rigidities of the backplate and of the diaphragm being such that, in use, the deflection of the diaphragm is at least twenty times as great as the deflection of the backplate.

12. A method as claimed in claim 11 which the step of mounting the electret foil diaphragm on the backplate comprises the steps of heating an electret foil, subsequently bonding the electret foil to a retaining ring and securing together the retaining ring and the backplate.

13. A method as claimed in claim 12 in which the steps of heating the electret foil and bonding the foil to a retaining ring comprise the steps of heating a plate, placing the electret foil on the plate and bonding the retaining ring to the foil with an adhesive while the foil is on the plate.

14. A method as claimed in claim 12 in which the temperature to which the electret foil is heated is of the order of 45° C.

* * * * *